United States Patent [19]

Roccaforte

[11] E Re. 29,263

[45] Reissued June 14, 1977

[54] PROTECTIVE CARTON

[75] Inventor: Harry I. Roccaforte, Western Springs, Ill.

[73] Assignee: Hoerner Waldorf Corporation, St. Paul, Minn.

[22] Filed: June 23, 1976

[21] Appl. No.: 699,036

Related U.S. Patent Documents

Reissue of:

[64] Patent No.: 3,923,235
Issued: Dec. 2, 1975
Appl. No.: 550,948
Filed: Feb. 19, 1975

[52] U.S. Cl. ..... 229/39 B; 229/14 C
[51] Int. Cl.[2] ..... B65D 25/14; B65D 5/58
[58] Field of Search ..... 229/39 B, 14 C

[56] References Cited

UNITED STATES PATENTS

| | | | |
|---|---|---|---|
| 2,611,529 | 9/1952 | Currivan | 229/39 B UX |
| 2,732,122 | 1/1956 | Bolding | 229/14 C X |
| 2,732,996 | 1/1956 | Pantalone | 229/14 C X |
| 3,182,885 | 5/1965 | Maio | 229/14 C |
| 3,232,513 | 2/1966 | Maio | 229/14 C |
| 3,400,879 | 9/1968 | O'Brien et al. | 229/39 C |

*Primary Examiner*—Davis T. Moorhead
*Attorney, Agent, or Firm*—Jerry F. Best

[57] ABSTRACT

An improved cushioning structure for a rectangular paperboard carton adapted to hold fragile particles such as an electronic vacuum tube, and blank for making same, wherein a cushioning section is provided which extends substantially the entire length of the carton and has three transverse cuts therein extending partially therethrough which define an upper, middle and lower web members as well as a tube support member which are defined by staggered fold lines which allow the cushioning section to be folded and extend between opposite walls of the carton on either side of those two opposite panels to receive and cushion the article. The tube support member extends across the middle of the carton to position the tube vertically within the carton.

7 Claims, 8 Drawing Figures

PROTECTIVE CARTON

Matter enclosed in heavy brackets [ ] appears in the original patent but forms no part of this reissue specification; matter printed in italics indicates the additions made by reissue.

BACKGROUND OF THE INVENTION

1. Field of the Invention

This disclosure relates generally to cartons made from paperboard or the like which are foldable as rectangular tubes with end closures which have means particularly adapted for retaining and protecting a fragile article to be stored and shipped therein.

2. Description of the Prior Art

There are several styles of cartons available for storing and shipping electron tubes, including the simple four-sided carton with a cylindrical sleeve which can be slipped down over the tube and both of which are inserted into the carton. Designs such as those shown in U.S. Pat. Nos. 3,182,885 or 3,232,513 to Maio often require complicated gluing or folding techniques and there is a need for a simple carton which is nevertheless effective for protecting the contents.

SUMMARY OF THE INVENTION

A carton and blank with means formed as a part thereof and foldable to the interior thereof for retaining and protecting a cylindrical fragile article such as an electronic vacuum tube, this means including a section with transverse cuts and vertical staggered fold lines defining a multiple of cushioning web members vertically staggered on either side of the center of the carton to receive the tube and a bottom support member with a downward reaching curve therein adapted to receive the end of the tube and space it from the end of the carton.

DETAILED DESCRIPTION OF THE PREFERRED EMBODIMENT

Figure 1:
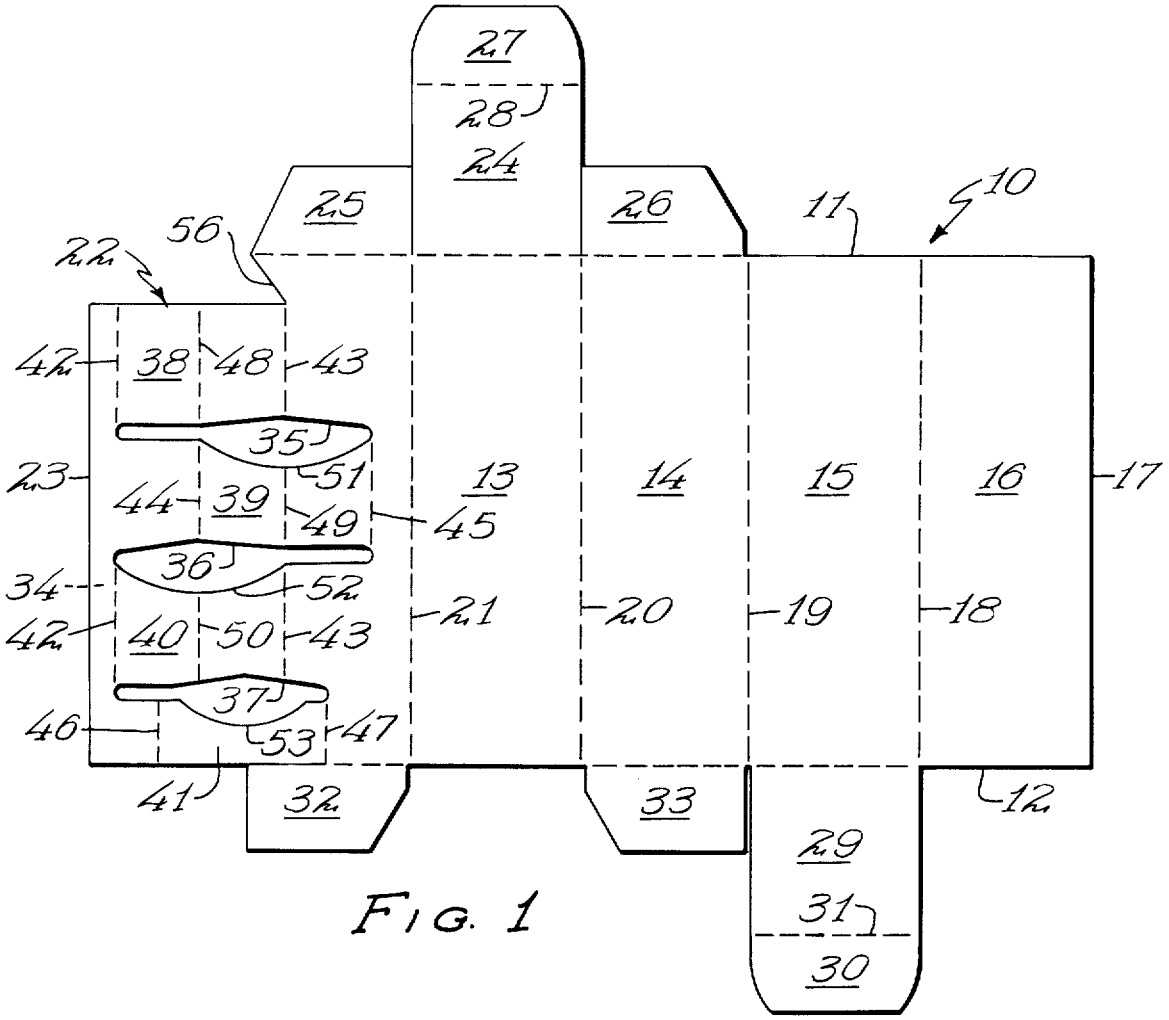
FIG. 1 is a plan view of a blanket, showing the outside thereof, which is adapted to be folded into the carton embodying the present invention.

It is clear that receptacles which are designed to be storage and shipping containers for electronics tubes must be highly reliable and effective because of the fragile nature of the components in certain electronics tubes. Nevertheless, they must be economical in cost since they are discarded after a single use. It is common to use paperboard or similar sheet-like material to manufacture these receptacles because of cost as well as the fact that they are easily folded and are light in weight. Accordingly a blank shown generally as 10 in FIG. 1 is provided which is generally rectangular in shape and has a top edge 11 and a bottom edge 12 which are arranged horizontal and parallel to each other. Within the blank 10 are positioned four parallel rectangular side wall panels 13, 14, 15 and 16 which are defined by an outer edge 17 and four parallel vertical fold lines arranged perpendicular to the horizontal top and bottom edges 11 and 12 and numbered 18, 19, 20 and 21 respectively.

Hingedly attached along the lateral edge 21, to the side wall panel 13 is a substantially rectangular cushioning section shown generally as 22 which extends substantially the full height of the carton blank and is defined in width by the outside lateral edge 23 which is parallel to the first lateral edge 21. The exact configuration and arrangements of closure flaps from both the top and bottom of the carton may be varied, and in the embodiment shown the top closure flaps can be seen as a major flap 24 hingedly attached along the top edge 11 to the side wall panel 13 and flanked by two minor top closure flaps 25 and 26 similarly attached to the top edge of the cushioning tuck-in locking tab 27 attached to the top edge thereof along a fold line 28. Similarly bottom closure flaps are provided hinged along the bottom edge 12 and include a major flap 29 attached to the bottom of the side wall panel 15 which has a tuck-in tab 30 attached thereto along fold line 31 and minor flaps 32 and 33 attached to the cushioning section 22 and the side wall panel 14 respectively.

Figure 2:
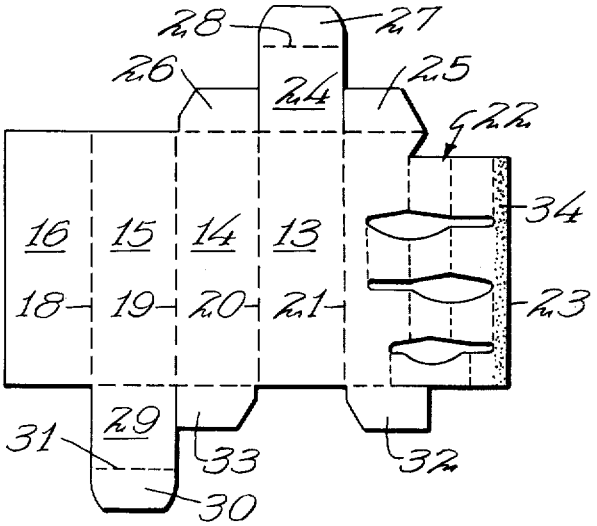
FIG. 2 is a plan view of the blank in FIG. 1 only reversed showing the inside thereof.
Figure 3:
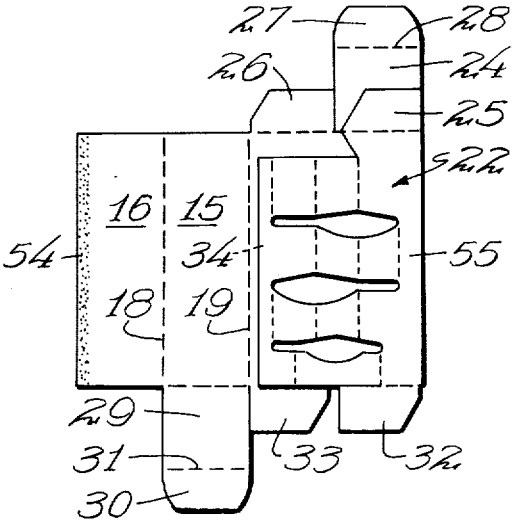
FIG. 3 is a plan view of the blank shown in FIG. 2, but partially folded to illustrate the folding and gluing technique for the present invention.
Figure 4:
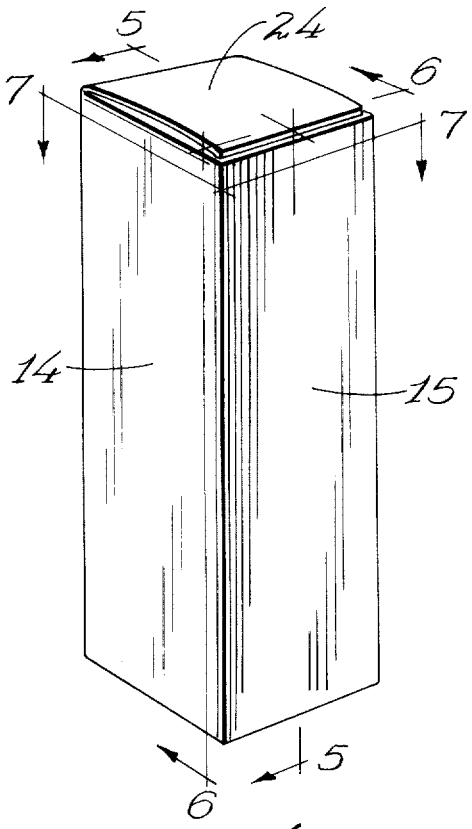
FIG. 4 is a perspective view of an assembled carton containing electron tube such as disclosed in the present invention.
Figure 5:
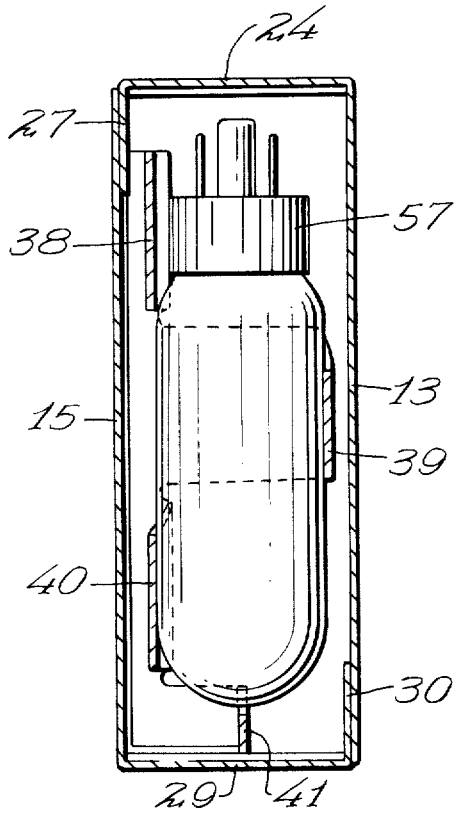
FIG. 5 is a side elevational view of the carton and tube shown in FIG. 4 taken along section lines 5—5 in FIG. 4.
Figure 7:
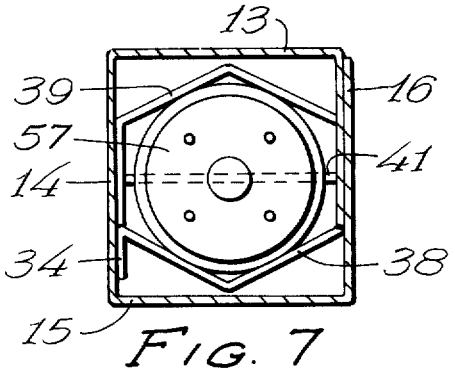
FIG. 7 is a sectional view of a portion of the carton and tube shown in FIG. 4 taken along section line 7—7 of FIG. 4.

As previously mentioned the blank 10 is shown in FIG. 1 with the outside surface up, and in FIGS. 2 and 3 with the inside surface up. In FIG. 2 it can be seen that there is a narrow band of adhesive 34 extending adjacent to the ouside lateral edge 23. This elongated glue section is folded along with the balance of the cushioning section 22 about the fold line 21 into contact with the side wall panel 14 adjacent to the fold line 19. The cushioning section 22 has three die cut elongated openings which extend horizontally across a portion of the section 22. A first of these openings 35 and a second of these openings 36 are of equal length and extend to within a fixed distance of the lateral edge 21 adjoining the side wall panel 13, and in the other direction extend to within a predetermined distance of the outer lateral edge 23, and in fact extend to approximately the edge of the elongated glue section 34.

An elongated opening parallel to the first and second openings 35 and 36 designated as 37 is spaced near the bottom of the blank in the cushioning section 22. There are three off-set cushioning members which are defined by these three elongated openings and are labeled as a top member 38, a middle web member 39 and a lower web member 40. In addition, there is a tube supporting fourth web 41 which is positioned at the very lower end of the cushioning section 22.

The top web member 38 and lower web member 40 are positioned directly over one another and the fold lines which define those members are colinear. The top web member is defined by a first vertical fold line 42 which is adjacent to the elongated glue section 34 and can also be seen as defining the left side of the lower web member 40 directly below. Lateral positioning of the vertical fold line 42 in the drawing places it near the edge of the two elongated openings 35 and 36. This is not a requirement but the fold line 42 must be located no closer to the outside lateral edge 23 than the furthest extension of the elongated openings 35 and 36. Otherwise the top and lower web members 38 and 40 would not be free to rotate into position across the carton. The significance of the spacing of the fold line 42 will be described later.

The opposite side of the top and lower web members 38 and 40 is defined by a second vertical fold line 43 which again are colinear in the two members and is spaced inwardly from the lateral edge 21 a fixed distance beyond the edge of the two elongated openings 35 and 36. That approximate spacing is found on the left hand side of the middle web member 39 which is defined on is left side by the fold line 44 and on its right side by the fold line 45. These spacings are equal on opposite sides of the alternating web members so that the web members are positioned equal distance from the axial center of the carton to provide optimum cushioning for the tube contained in the carton. The tube support member 41 and the lower end of the cushioning section 22 is spaced in the center of the member so that it extends across the center of the carton in its erected position and is defined by two vertical hinge lines 46 and 47 on either side thereof. The elongated opening 37 is not required to extend on the right hand side beyond the fold line 47, and extends beyond the fold line 46 on the left hand side to within the location of the fold line 42 for purposes of allowing the lower web member 40 to rotate as the carton is erected. Each of the three web members may have a center fold line formed therein which permits lateral deflection of the members when the electron to be inserted therein is greater in diameter than the spacing between the members. These fold lines ae shown as 48 in the top web member 38, 49 in the top web member 39 and 50 in the lower web member 40.

Figure 6:
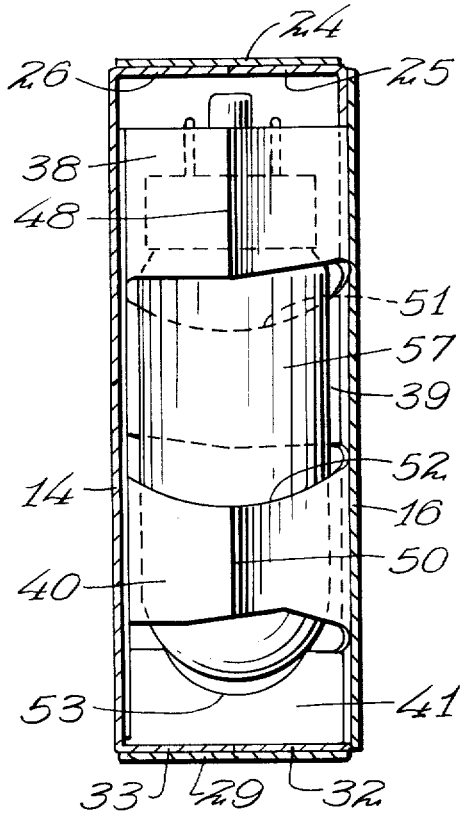
FIG. 6 is another side elevational section view of the carton and tube of FIG. 4, but shown at right angles to the view of FIG. 5 and taken along section lines 6—6 of FIG. 4.
Figure 8:
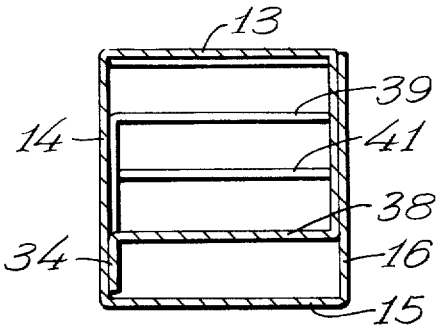
FIG. 8 illustrates the appearance of the carton showing the configuration of the carton and certain components thereof prior to insertion of the electron tube.

The three elongated openings 35, 36 and 37 are provided with a downwardly extending shallow curved portion which, in the erected position, helps act to funnel the rounded end of the tube downwardly into the carton as it is inserted and for that reason are only formed on the bottom edge of the opening and in the area over the middle and lower web members 39 and 40. These curved portions are shown as 51, 52 and 53, respectively, and it should be noted that the curved portion 53 in the elongated opening 37 serves as the cradle for the rounded end of the electron tube as can be seen in FIG. 6.

FIGS. 2 and 3 illustrate the assembly of the carton which includes the folding of the cushioning section about the hinge line 21 and the contacting of the elongated glue section 34 with the portion of the side wall panel 14 adjacent the hinge line 19. The other location for adhesive in near the opposite lateral edge 17 and is shown in FIG. 3 as an elongated glue section 54. The second folding step is accomplished by bringing the two side wall panels 15 and 16 over and on top of the bushing section 22 by folding about the line 19 which brings the elongated glue section 54 into contact with the outer portion of the cushioning section 22 which is adjacent to the fold line 21 and is defined on its inner edge by the fold line 45 and the middle web section 39. For convenience this area at the edge of the cushioning section 22 adjacent the fold line 21 will be referred to as an elongated glue section 55 since it is inmaterial whether the glue is applied to the outer portion adjacent the fold line 21 or the side wall panel 54 adjacent the outer edge 17. In the blank shown in FIG. 1, there is a notch 56 cut near the top of the cushioning section 22, and the purpose for that is as seen in FIG. 6 is to allow a small portion of the base of the electron tube, which will be designated as 57 in the drawings to extend beyond the cushioning section to allow the user to grasp it and remove it from the carton. FIGS. 4 through 8 clearly illustrate the relationship of the various parts of the carton and of particular note are FIGS. 7 and 8 which show the position of the web members immediately after erection of the carton and how they can deflect laterally about the medial fold lines in the web members when a tube 57 is inserted of a large diameter. FIG. 6 helps to illustrate how the downwardly curved portions 51 and 52 of the elongated openings tend to interact with the rounded end of the electron tube 57 to guide to tube into the carton and downwardly against the tube supporting fourth web 41.

In accordance with the Patent Statutes, I have described the principles of construction and operation of my improvement in PROTECTIVE CARTON; and while I have endeavored to set forth the best embodiment thereof, I desire to have it understood that obvious changes may be made within the scope of the following claims without departing from the spirit of my invention.

I claim:

1. In a one-piece carton for shipping and storing fragile articles, said carton made from foldable paperboard or similar sheet-like material and having four side wall panels rectangularly arranged to form an elongated tube and having top and bottom sets of closure flaps for closing the ends of said carton, improved means within said carton for holding said fragile article, said improved means comprising the following:

a cushioning section made from said material and extending between two opposite panels of said four side wall panels, said section extending substantially the length of said carton;

said cushioning section having an upper web member extending between said two opposite panels near one lateral side of said two panels;

said cushioning section also having a middle web member extending generally parallel to said upper web member but positioned below said upper web member and near the opposite lateral side of said two panels;

a lower web member beneath said middle web member and positioned in alignment with said upper web member;

[a tube supporting fourth web positioned below said lower web member and extending between said two opposite panels near the center thereof;]

said members [and said fourth web] connecting in said cushioning section to elongated glue sections connected adjacent to respective opposite lateral edges of said two opposite panels.

2. The carton of claim 1, including fold lines near the center of said upper, middle and lower web members to allow lateral deflection tpo accommodate said article.

3. The carton of claim 1, wherein said upper, middle and lower web members each have a top edge formed in a shallow recessed curve.

4. A one-piece blank made from foldable paperboard or similar sheet-like material and adapted to be erected into a carton for storing and shipping a fragile article, said blank comprising:

four substantially rectangular side wall panels hingedly connected to one another along three parallel vertical fold lines, said four side walls together having a top edge, a bottom edge, and opposed vertical lateral edges extending parallel to said fold lines;

a substantially rectangular cushioning section made from said material and hingedly attached along a first of said lateral edges to a first of said side wall panels, said section having an outside lateral edge parallel to said first lateral edge;

end closure flaps hingedly attached to certain of said side walls and said cushioning section along said top and bottom edges thereof;

said cushioning section having formed therein first and second die cut elongated openings extending perpendicular to said lateral edges, said elongated openings extending to within a first predetermined distance of said first lateral edge and a second predetermined distance of said outside lateral edge of said cushioning section;

a third elongated opening parallel to said first and second openings and positioned near the bottom of said cushioning section, said third opening thereby defining with said first and second elongated openings three cushioning web members [and a tube supporting fourth web, said fourth web positioned at the bottom of said cushioning section];

said [third] *three* cushioning members arranged as a top web member, *a middle web member*, and a lower web member;

said upper and lower web members each having first vertical fold lines formed therein, said third fold lines being co-linear and spaced from said outer edge;

said upper and lower web members also each having second vertical fold lines formed therein, said second fold lines being co-linear and spaced from said first lateral edge beyond the end of said first and second openings; *and* said middle web member having a vertical fold line formed therein at the end of said first and second openings adjacent said first lateral edge and a second vertical fold line spaced inwardly from said first fold lines in said upper and lower web members [;].

[said fourth web having two vertical fold lines formed therein and spaced from each other within the lengthwise extent of said third elongated opening.]

5. The blank of claim 4, wherein said elongated openings are defined by top and bottom edges and at least one of said [top] *bottom* edges includes a shallow recessed curve portion.

*6. The carton of claim 1, including a tube supporting fourth web positioned below said lower web member and extending between said two opposite panels near the center thereof, said fourth web also connecting in said cushioning section to said elongated glue sections.*

*7. The blank of claim 4, including a tube supporting fourth web positioned at the bottom of said cushioning section, said fourth web having two vertical fold lines formed therein and spaced from each other within the lengthwise extent of said third elongated opening.*

* * * * *